United States Patent
Tanaka

(10) Patent No.: US 8,525,940 B2
(45) Date of Patent: Sep. 3, 2013

(54) ILLUMINATOR AND PROJECTOR

(75) Inventor: Katsumi Tanaka, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 14 days.

(21) Appl. No.: 13/337,899

(22) Filed: Dec. 27, 2011

(65) Prior Publication Data

US 2012/0188468 A1    Jul. 26, 2012

(30) Foreign Application Priority Data

Jan. 24, 2011    (JP) .................. 2011-011688

(51) Int. Cl.
*G02F 1/1335*    (2006.01)

(52) U.S. Cl.
USPC ............................................. 349/5

(58) Field of Classification Search
None
See application file for complete search history.

(56) References Cited

U.S. PATENT DOCUMENTS 5,986,809 A    11/1999    Itoh et al.
7,611,246 B2    11/2009    Kimura et al.

FOREIGN PATENT DOCUMENTS

JP    WO 97/50012 A1    12/1997
JP    A-2007-17459    1/2007

*Primary Examiner* — Lucy Chien
(74) *Attorney, Agent, or Firm* — Oliff & Berridge, PLC.

(57) ABSTRACT

An illuminator includes: a light source that emits light; a first lens array including a plurality of first lenslets; a second lens array including a plurality of second lenslets corresponding to the plurality of first lenslets; a polarization conversion element that converts light fluxes from the second lens array into polarized light fluxes and outputs the polarized light fluxes; and a superimposing lens that superimposes sub-light fluxes from the polarization conversion element, wherein the plurality of first lenslets and the plurality of second lenslets are each arranged in a matrix, the polarization conversion element is formed of a plurality of columns of polarization conversion units that convert the light fluxes from the plurality of second lenslets into the polarized light fluxes on a column basis, and the number of columns of the polarization conversion units is fewer than the number of columns of the first lenslets and the second lenslets.

15 Claims, 5 Drawing Sheets

ILLUMINATOR AND PROJECTOR

BACKGROUND

1. Technical Field

The present invention relates to an illuminator and a projector.

2. Related Art

There has been a known illuminator including a light source that emits light, a first lens array formed of a plurality of first lenslets, a second lens array formed of a plurality of second lenslets corresponding to the plurality of first lenslets, a polarization conversion element that converts light fluxes from the second lens array into polarized light fluxes and outputs them, and a superimposing lens that superimposes sub-light fluxes from the polarization conversion element on one another (see International Publication No. 97/50012, for example). The first lens array, the second lens array, and the superimposing lens form alight homogenizing system that homogenizes the in-plane optical intensity distribution of the light (what is called lens integrator system).

In the illuminator of related art, the plurality of first lenslets and the plurality of second lenslets are each arranged in a matrix (also called row-column matrix). The polarization conversion element is formed of a plurality of columns of polarization conversion units that convert light fluxes from the plurality of second lenslets into polarized light fluxes on a column basis. Further, the number of columns of the first lenslets and the number of columns of the second lenslets are the same as the number of columns of the polarization conversion units.

The illuminator of related art, which includes the lens integrator system and the polarization conversion element, can output polarized light having a homogenized in-plane optical intensity distribution and hence can be suitably used with an apparatus using "polarized light having a homogenized in-plane optical intensity distribution" (such as liquid crystal apparatus).

In a technical field of illuminators, an illuminator is always required to use light more and more efficiently, which holds true for the illuminator including the lens integrator system and the polarization conversion element described above.

SUMMARY

An advantage of some aspects of the invention is to provide an illuminator capable of using light more efficiently than an illuminator of related art. Another advantage of some aspects of the invention is to provide a projector including the illuminator described above and using light efficiently.

It is known that the loss of light that passes through a polarization conversion element typically decreases as the size of a polarization conversion unit increases. In view of this fact, it is conceivable to increase the size of each polarization conversion unit by reducing the number of columns of the polarization conversion units. A study conducted by the present inventor, however, shows that reducing the number of columns of the polarization conversion units hardly allows an illuminator of related art to use light more efficiently, as shown in Experimental Example described later.

The present inventor has further conducted a study based on the result described above and showed that setting the number of columns of the polarization conversion units to differ from the number of columns of the first and second lenslets, that is, setting the number of columns of the polarization conversion units to be fewer than the number of columns of the first and second lenslets, allows an illuminator to use light more efficiently than an illuminator of related art as shown in Experimental Example described later. The present inventor has thus attained the invention. The invention is implemented as follows.

[1] An illuminator according to an aspect of the invention includes a light source that emits light, a first lens array including a plurality of first lenslets, a second lens array including a plurality of second lenslets corresponding to the plurality of first lenslets, a polarization conversion element that converts light fluxes from the second lens array into polarized light fluxes and outputs the polarized light fluxes, and a superimposing lens that superimposes sub-light fluxes from the polarization conversion element. The plurality of first lenslets and the plurality of second lenslets are each arranged in a matrix. The polarization conversion element is formed of a plurality of columns of polarization conversion units that convert the light fluxes from the plurality of second lenslets into the polarized light fluxes on a column basis. The number of columns of the polarization conversion units is fewer than the number of columns of the first lenslets and the second lenslets.

The illuminator according to the aspect of the invention, in which the number of columns of the polarization conversion units is fewer than the number of columns of the first lenslets and the second lenslets, can use light more efficiently than an illuminator of related art, as shown in Experimental Example described later.

The illuminator according to the aspect of the invention, which includes the lens integrator system and the polarization conversion element as in the case of an illuminator of related art, can output polarized light having a homogenized in-plane optical intensity distribution and hence can be suitably used with an apparatus using "polarized light having a homogenized in-plane optical intensity distribution."

Each of the polarization conversion units includes a polarization separation layer that transmits one of the linearly polarized light components contained in the light fluxes from the second lenslets and reflects the other linearly polarized light component in the direction perpendicular to an illumination optical axis, a reflection layer that reflects the other linearly polarized light component having been reflected off the polarization separation layer in the direction parallel to the illumination optical axis, and a wave plate that converts the other linearly polarized light component having been reflected off the reflection layer into the one linearly polarized light component. The polarization conversion unit may convert the light fluxes from the second lenslets in a single column or may convert the light fluxes from the second lenslets in two or more columns.

The "polarized light" used herein is not necessarily one type of polarized light in an exact sense but may be light practically usable as one type of polarized light.

[2] In the illuminator according to the aspect of the invention, the interval between the arranged polarization conversion units is preferably greater than the width of each of the first lenslets.

In the aspect of the invention, the interval (distance) between the arranged polarization conversion units may be equal to the width of each of the first lenslets, but the configuration described above allows the illuminator to use light more efficiently.

[3] In the illuminator according to the aspect of the invention, the number of columns of the first lenslets and the second lenslets is preferably greater than the number of columns of the polarization conversion units by one, and the number of columns of the first lenslets and the second lenslets is preferably an odd number.

The configuration described above allows the optical path to be reasonably set with the number of columns of the first lenslets and the second lenslets not being greatly different from the number of columns of the polarization conversion units.

[4] In the illuminator described above, the number of columns of the first lenslets and the second lenslets is preferably five, and the number of columns of the polarization conversion units is preferably four.

The configuration described above allows the lens integrator system and the polarization conversion element to be configured in a relatively similar manner in which those typically used at present are configured, whereby the optical path can be reasonably set.

[5] In the illuminator described above, light incident on the first lenslets in a column positioned along a center line (hereinafter referred to as central column) among the plurality of first lenslets preferably enters the second lens array along an optical axis extending along "a plane that contains a central axis of the first lens array and extends along the columns of the first lens array (hereinafter referred to as reference plane)." Light incident on the first lenslets in columns on both sides of the central column preferably enters the second lens array along optical axes that approach the reference plane. Light incident on the first lenslets in outermost columns among the plurality of first lenslets preferably enters the second lens array along optical axes that extend away from the reference plane.

The configuration described above allows the light from the second lens array to be outputted as polarized light through the polarization conversion units arranged in a reduced number of columns.

[6] A projector according to another aspect of the invention includes any of the illuminators described above, a light modulator that modulates light from the illuminator in accordance with image information, and a projection system that projects light from the light modulator.

The projector according to the aspect of the invention, which includes any of the illuminators described above capable of using light more efficiently than an illuminator of related art, uses light efficiently.

[7] In the projector according to the aspect of the invention, the light modulator is preferably a liquid crystal light modulator.

The invention is suitably applicable to a projector including a liquid crystal light modulator.

BRIEF DESCRIPTION OF THE DRAWINGS

The invention will be described with reference to the accompanying drawings, wherein like numbers reference like elements.

DESCRIPTION OF EXEMPLARY EMBODIMENTS

An illuminator and a projector according to an embodiment of the invention will be described below with reference to the drawings.

Embodiment

Figure 1:
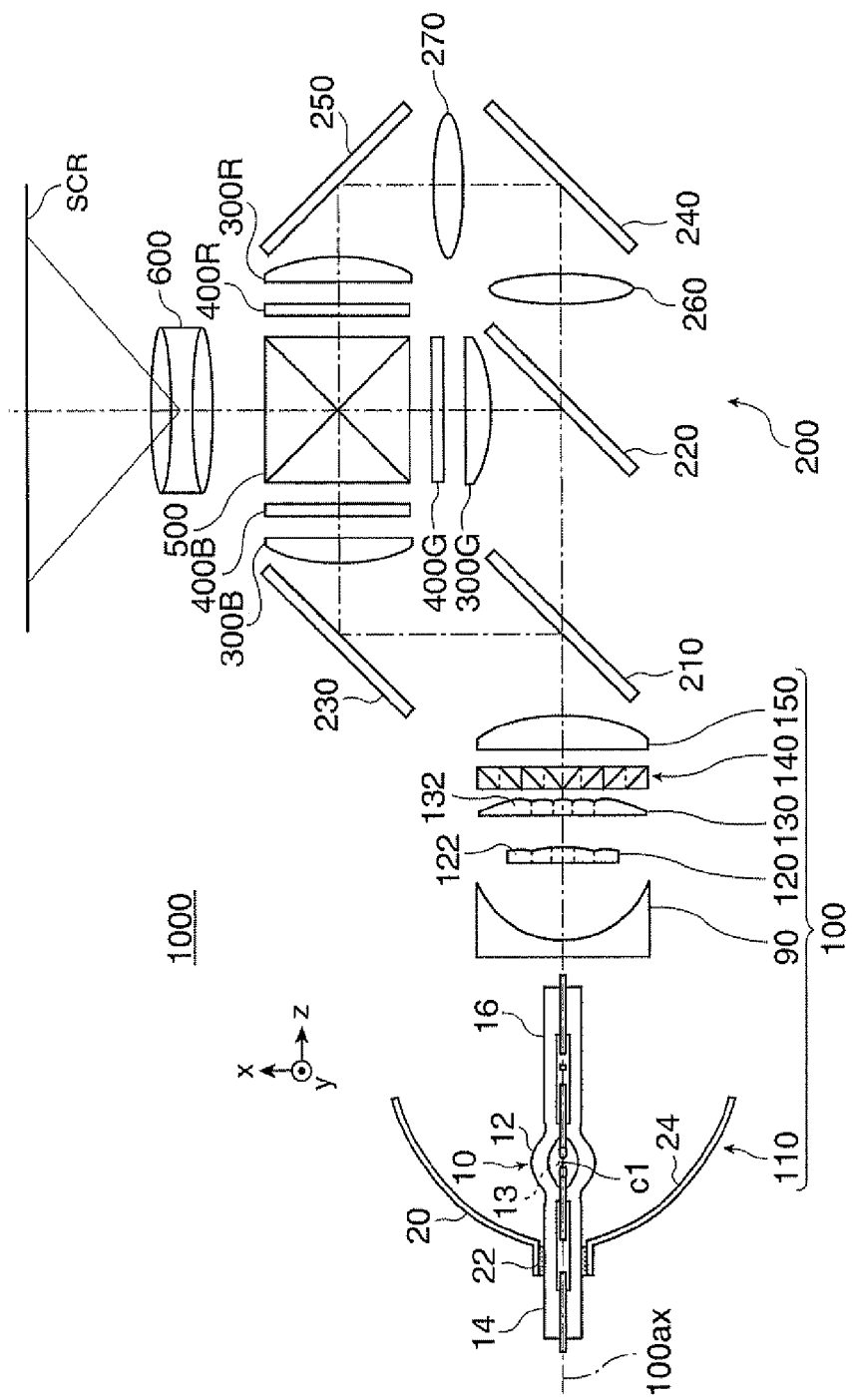
FIG. 1 is a plan view showing an optical system of a projector according to an embodiment.

FIG. 1 is a plan view showing an optical system of a projector 1000 according to an embodiment. In FIG. 1, a light source 110 is drawn in a cross-sectional form. The same holds true for the other plan views.

Figure 2A:
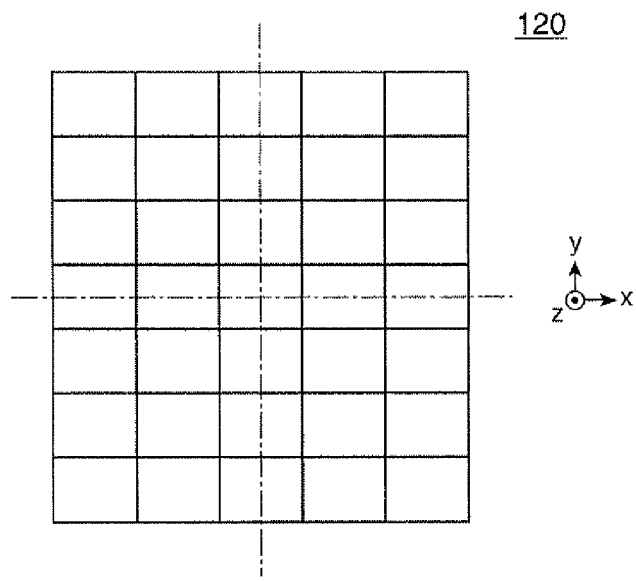
FIGS. 2A and 2B describe an illuminator according to the embodiment.
Figure 2B:
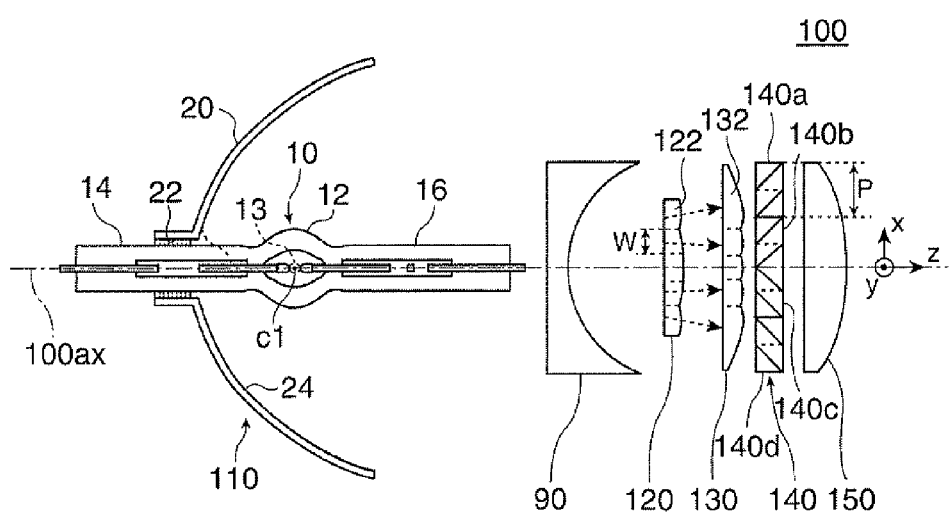

FIGS. 2A and 2B describe an illuminator 100 according to the embodiment. FIG. 2A shows a first lens array 120 viewed from the side where a second lens array 130 is present. FIG. 2B is a plan view showing an optical system of the illuminator 100. The broken-line arrows in FIG. 2B represent optical axes of sub-light fluxes from the first lens array 120 toward the second lens array 130.

It is noted that FIGS. 1, 2A, and 2B are schematic views and the shape of each optical element in the figures does not necessarily reflect the actual shape in an exact sense.

In the following description, three directions perpendicular to one another are called a z-axis direction (direction representing illumination optical axis $100ax$ in FIG. 1), an x-axis direction (direction parallel to plane of view in FIG. 1 and perpendicular to z axis), and a y-axis direction (direction perpendicular to plane of view in FIG. 1 and perpendicular to z axis).

In the following description, rows and columns are defined as follows: those extending along the x-axis direction are called rows, and those extending along the y-axis direction are called columns.

The projector 1000 according to the embodiment includes an illuminator 100, a color separation/light guiding system 200, three liquid crystal light modulators 400R, 400G, and 400B that modulate red light, green light, and blue light respectively, a cross dichroic prism 500, and a projection system 600, as shown in FIG. 1.

The illuminator 100 includes a light source 110, a concave lens 90, a first lens array 120, a second lens array 130, a polarization conversion element 140, and a superimposing lens 150. The illuminator 100 emits light containing red light, green light, and blue light as illumination light (that is, light usable as white light) along the illumination optical axis $100ax$.

The light source 110 includes an arc tube 10 and a reflector 20, as shown in FIGS. 1 and 2B. The light source 110 outputs light from a light emitting portion 13 (which will be described later) toward an area to be illuminated, and the light from the light emitting portion 13 is convergent light having a central axis that coincides with the illumination optical axis $100ax$. Reference character c1 denotes the center of the light emitting portion 13.

The arc tube 10 includes a lamp body 12 that accommodates the light emitting portion 13, a pair of sealing portions 14 and 16 extending from both sides of the lamp body 12, a pair of electrodes disposed along the illumination optical axis $100ax$, a pair of metal foils sealed in the pair of sealing portions 14 and 16, and a pair of lead wires electrically connected to the pair of metal foils. A variety of arc tubes that emit high-intensity light can be employed as the arc tube 10, such as a metal-halide lamp, a high-pressure mercury lamp, and an ultrahigh-pressure mercury lamp. The light emitting portion 13 is positioned in the vicinity of a first focal point of a reflection surface 24, which will be described later. The light emitting portion 13 emits light containing red light, green light, and blue light.

The requirements and other factors of the components of the arc tube 10 are as follows by way of example: The lamp body 12 and the sealing portions 14 and 16 are made of quartz glass or any other suitable material, and the lamp body 12 encapsulates mercury, a rare gas, and a trace of halogen. The electrodes are, for example, tungsten electrodes, and the metal foils are, for example, molybdenum foils. The lead wires are made, for example, of molybdenum or tungsten.

The reflector 20 is disposed at the first sealing portion 14, which is one of the pair of sealing portions 14 and 16, and reflects the light emitted from the light emitting portion 13 toward the area to be illuminated. The reflector 20 has an opening 22, which the first sealing portion 14 of the art tube 10 is inserted into and bonded to, and a reflection surface 24, which reflects light toward the area to be illuminated. The reflection surface 24 has an ellipsoidal shape and reflects the light emitted from the light emitting portion 13 positioned in the vicinity of the first focal point of the reflection surface 24. The reflected light converges to a point in the vicinity of a second focal point of the reflection surface 24 that is located closer to the area to be illuminated. The reflector 20 is fixed to the first sealing portion 14 with cement or any other suitable inorganic adhesive with which the opening 22 is filled.

A suitable base material of which the reflection surface 24 is made can, for example, be crystallized glass or alumina ($Al_2O_3$). A visible-light-reflection layer formed of a dielectric multilayer film made, for example, of titanium oxide ($TiO_2$) and silicon oxide ($SiO_2$) is formed on the reflection surface 24.

The concave lens 90 converts the convergent light from the light source 110 into substantially collimated light. The concave lens 90 is disposed next to the reflector 20 on the side where the area to be illuminated is present, as shown in FIGS. 1 and 2B. The concave lens 90 transmits the light from the reflector 20 toward the first lens array 120.

The first lens array 120, the second lens array 130, and the superimposing lens 150 form a light homogenizing system that homogenizes the in-plane optical intensity distribution of the light to be incident on the light modulators (what is called lens integrator system).

The first lens array 120 includes a plurality of first lenslets 122, which divide the light having passed through the concave lens 90 into a plurality of sub-light fluxes, as shown in FIGS. 1 and 2A. The first lens array 120 serves as a light flux dividing optical element that divides the light from the light source 110 into a plurality of sub-light fluxes, and the plurality of first lenslets 122 are arranged in a matrix of seven rows and five columns in a plane perpendicular to the illumination optical axis 100ax. Although not described in detail, the exterior shape of each of the first lenslets 122 (a rectangle having a transverse/longitudinal (x-axis direction/y-axis direction) ratio of 4:3) is substantially similar to the exterior shape of an image formation area of each of the liquid crystal light modulators 400R, 400G, and 400B. The exterior shape of each of the first lenslets is not limited to the shape described above and may be any shape that is substantially similar to the exterior shape of the image formation area of each of the light modulators.

The second lens array 130 includes a plurality of second lenslets 132 corresponding to the plurality of first lenslets 122 in the first lens array 120. The second lens array 130 in conjunction with the superimposing lens 150 has a function of focusing images of the first lenslets 122 in the vicinity of the image formation area of each of the liquid crystal light modulators 400R, 400G, and 400B. The second lens array 130 is so configured that the plurality of second lenslets 132 are arranged in a matrix of seven rows and five columns in a plane perpendicular to the illumination optical axis 100ax.

As described above, in the illuminator 100, the number of columns of the first lenslets 122 and the second lenslets 132 is five. That is, the number of columns of the first lenslets 122 and the second lenslets 132 is an odd number.

In the illuminator 100, the light incident on the first lenslets in the column positioned along the center line (hereinafter referred to as central column) among the plurality of first lenslets 122 enters the second lens array 130 along an optical axis extending along "a plane that contains the central axis of the first lens array 120 (which coincides with the illumination optical axis 100ax in the embodiment) and extends along the columns in the first lens array 120 (hereinafter referred to as reference plane, which coincides with the illumination optical axis 100ax in FIG. 2B)," as shown in FIG. 2B. The light incident on the first lenslets in the columns on both sides of the central column enters the second lens array 130 along optical axes that approach the reference plane. The light incident on the first lenslets in the outermost columns among the plurality of lenslets 122 enters the second lens array 130 along optical axes that extend away from the reference plane.

The polarization conversion element 140 changes the polarization directions of the sub-light fluxes having been divided by the first lens array 120 and having passed through the second lens array 130 to an aligned polarization direction and outputs light fluxes having substantially one type of linearly polarized light component (polarized light fluxes). The polarization conversion element 140 is formed of a plurality of columns of polarization conversion units that convert the light fluxes from the plurality of second lenslets 132 into polarized light fluxes on a column basis, and the number of columns of the polarization conversion units is four, as shown in FIGS. 1 and 2B. Reference characters 140a to 140d in FIG. 2B denote the polarization conversion units. In the illuminator 100, the number of columns (four) of the polarization conversion units is fewer than the number of columns (five) of the first lenslets 122 and the second lenslets 132, or the number of columns of the first lenslets 122 and the second lenslets 132 is greater than the number of columns of the polarization conversion units by one.

The interval P between the thus arranged polarization conversion units is greater than the width W of each of the first lenslets 122, as shown in FIG. 2B.

Each of the polarization conversion units 140a to 140d includes a polarization separation layer that transmits one of the linearly polarized light components contained in the light from the light source 110 and reflects the other linearly polarized light component in the direction perpendicular to the illumination optical axis 100ax, a reflection layer that reflects the other linearly polarized light component having been reflected off the polarization separation layer in the direction parallel to the illumination optical axis 100ax, and a wave plate that converts the other linearly polarized light component having been reflected off the reflection layer into the one linearly polarized light component.

The polarization conversion units 140a, 140b and the polarization conversion units 140c, 140d are disposed on opposite sides of and symmetrically with respect to the illumination optical axis 100ax.

In the illuminator 100, the light incident on the first lenslets 122 in the central column passes through the second lenslets 132 in the central column and enters the polarization conversion units 140*b* and 140*c*. The light incident on the first lenslets 122 in the columns on both sides of the central column passes through the second lenslets 132 in the columns on both sides of the central column and enters the polarization conversion unit 140*b* or 140*c*. The light incident on the first lenslets 122 in the outermost columns passes through the second lenslets 132 in the outermost columns and enters the polarization conversion unit 140*a* or 140*d*. That is, each of the polarization conversion units 140*a* and 140*d* converts the light from the second lenslets 132 in a single column into polarized light, and the polarization conversion units 140*b* and 140*c* together convert the light from the second lenslets 132 in three columns into polarized light.

The superimposing lens 150 is an optical element that collects the sub-light fluxes from the polarization conversion element 140 and superimposes them in the vicinity of the image formation areas of the liquid crystal light modulators 400R, 400G, and 400B. The superimposing lens 150 is so disposed that the optical axis thereof substantially coincides with the illumination optical axis 100*ax*. The superimposing lens 150 may be a compound lens formed of a combination of a plurality of lenses.

The color separation/light guiding system 200 includes dichroic mirrors 210 and 220, reflection mirrors 230, 240, and 250, and relay lenses 260 and 270. The color separation/light guiding system 200 has a function of separating the light from the illuminator 100 into red light, green light, and blue light and guiding the red light, the green light, and the blue light to the respective liquid crystal light modulators 400R, 400G, and 400B, which are target objects to be illuminated.

Collector lenses 300R, 300G, and 300B are disposed between the color separation/light guiding system 200 and the liquid crystal light modulators 400R, 400G, 400B.

Each of the dichroic mirrors 210 and 220 has a wavelength selection/transmission film formed on a substrate, the wavelength selection/transmission film reflecting light in a predetermined wavelength range and transmitting light in the other wavelength range.

The dichroic mirror 210 reflects the red light component and transmits the green and blue light components.

The dichroic mirror 220 reflects the green light component and transmits the blue light component.

The red light reflected off the dichroic mirror 210 is reflected off the reflection mirror 230, passes through the collector lens 300R, and is incident on the image formation area of the liquid crystal light modulator 400R for red light.

The green light and the blue light pass through the dichroic mirror 210, and only the green light is reflected off the dichroic mirror 220, passes through the collector lens 300G, and is incident on the image formation area of the liquid crystal light modulator 400G for green light.

The blue light having passed through the dichroic mirror 220 travels along the relay lens 260, the light incident-side reflection mirror 240, the relay lens 270, the light exiting-side reflection mirror 250, and the collector lens 300B and is incident on the image formation area of the liquid crystal light modulator 400B for blue light. The relay lenses 260 and 270 and the reflection mirrors 240 and 250 have a function of guiding the blue light component having passed through the dichroic mirror 220 to the liquid crystal light modulator 400B.

The reason why the relay lenses 260 and 270 are provided along the optical path for blue light is to compensate the optical path length for blue light, which is longer than the optical path lengths for the red light and the green light, so that the blue light can be used efficiently without being affected, for example, by divergence of the blue light. In the projector 1000 according to the embodiment, which is configured to compensate the longer optical path length for blue light, the optical path for red light may alternatively include a relay lens and a reflection mirror so that the optical path length for red light increases.

The liquid crystal light modulators 400R, 400G, and 400B, which modulate the light from the illuminator 100 in accordance with image information, modulate the color light fluxes incident thereon in accordance with image information to form a color image. Although not shown, light incident-side polarizers are interposed between the collector lenses 300R, 300G, 300B and the liquid crystal light modulators 400R, 400G, 400B, and light exiting-side polarizers are interposed between the liquid crystal light modulators 400R, 400G, 400B and the cross dichroic prism 500. The light incident-side polarizers, the liquid crystal light modulators, and the light exiting-side polarizers modulate the color light fluxes incident thereon.

Each of the liquid crystal light modulators 400R, 400G, and 400B is a transmissive liquid crystal light modulator that encapsulates and seals a liquid crystal material, which is an electro-optic substance, between a pair of transparent glass substrates. For example, a polysilicon TFT is used as a switching device to modulate the polarization direction of one type of linearly polarized light having exited through each of the light incident-side polarizers in accordance with a given image signal. The exterior shape of the image formation area of each of the liquid crystal light modulators 400R, 400G, and 400B is a rectangle having a transverse/longitudinal (x-axis direction/y-axis direction) ratio of 4:3).

The cross dichroic prism 500 is an optical element that combines optical images carried by the modulated color light fluxes having exited through the light exiting-side polarizers to form a color image. The cross dichroic prism 500 is formed by bonding four right-angle prisms and thus has a substantially square shape in a plan view. Dielectric multilayer films are formed on the substantially X-shaped interfaces between the bonded right-angle prisms. The dielectric multilayer film formed on one of the substantially X-shaped interfaces reflects the red light, whereas the dielectric multilayer film formed on the other interface reflects the blue light. These dielectric multilayer films deflect the red light and the blue light, which then travel in the same direction as the green light, whereby the three color light fluxes are combined.

The color image having exited from the cross dichroic prism 500 is projected through the projection system 600 on a screen SCR.

Advantageous effects provided by the illuminator 100 and the projector 1000 according to the embodiment will next be described.

In the illuminator 100 according to the embodiment, since the number of columns of the polarization conversion units is fewer than the number of columns of the first lenslets 122 and the second lenslets 132, the illuminator 100 can use light more efficiently than an illuminator of related art, as shown in Experimental Example described later.

Further, the illuminator 100 according to the embodiment, which includes the lens integrator system and the polarization conversion element 140 as in the case of an illuminator of related art, can output polarized light having a homogenized in-plane optical intensity distribution and hence can be suitably used with an apparatus using "polarized light having a homogenized in-plane optical intensity distribution."

Moreover, the illuminator 100 according to the embodiment, in which the interval P between the arranged polarization conversion units is greater than the width W of each of the first lenslets 122, can use light more efficiently.

Further, in the illuminator 100 according to the embodiment, since the number of columns of the first lenslets 122 and the second lenslets 132 is greater than the number of columns of the polarization conversion units by one, and the number of columns of the first lenslets 122 and the second lenslets 132 is an odd number, the optical path can be reasonably set with the number of columns of the first lenslets and the second lenslets not being greatly different from the number of columns of the polarization conversion units.

Further, in the illuminator 100 according to the embodiment, since the number of columns of the first lenslets 122 and the second lenslets 132 is five and the number of columns of the polarization conversion units is four, the lens integrator system and the polarization conversion element can be configured in a relatively similar manner in which those typically used at present are configured, whereby the optical path can be reasonably set.

Further, the illuminator 100 according to the embodiment, in which the light incident on the first lenslets 122 in the central column among the plurality of first lenslets 122 is incident on the second lens array 130 along an optical axis extending along the reference surface, the light incident on the first lenslets 122 in the columns on both sides of the central column is incident on the second lens array 130 along optical axes that approach the reference surface, and the light incident on the first lenslets 122 in the outermost columns among the plurality of first lenslets 122 is incident on the second lens array 130 along optical axes that extend away from the reference surface, allows the light from the second lens array to be outputted as polarized light through the polarization conversion units arranged in a reduced number of columns.

The projector 1000 according to the embodiment, which includes the illuminator 100 according to the embodiment capable of using light more efficiently than an illuminator of related art, uses light efficiently.

The invention is suitably applicable to the projector 1000 described above including liquid crystal light modulators as the light modulators.

EXPERIMENTAL EXAMPLE

Figure 3A:
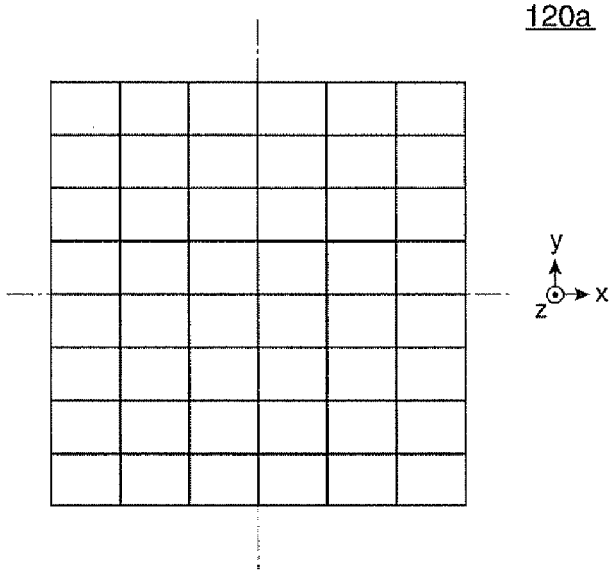
FIGS. 3A and 3B describe an illuminator according to Experimental Example.
Figure 3B:
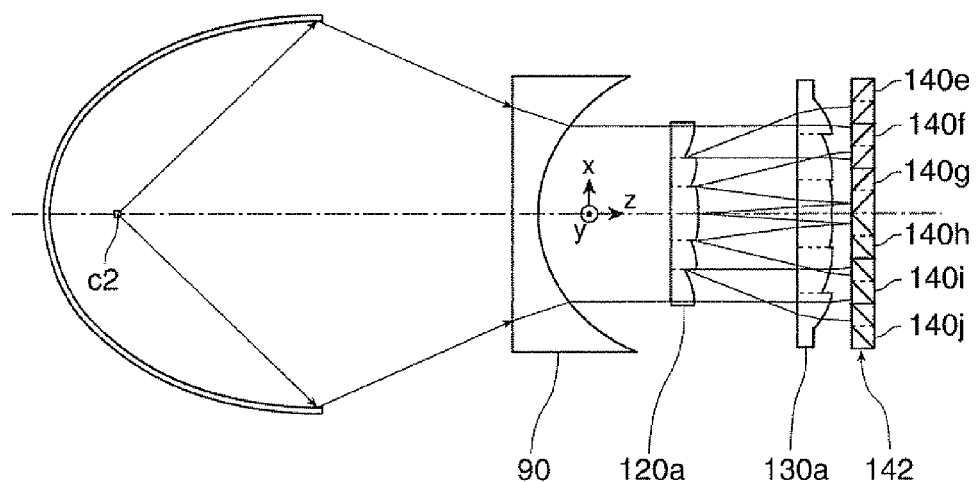

FIGS. 3A and 3B describe an illuminator 100*a* according to Experimental Example. FIG. 3A shows a first lens array 120*a* viewed from the side where a second lens array 130*a* is present, and FIG. 3B shows how light is divided in the illuminator 100*a*. In FIG. 3B, a superimposing lens 150*a* is omitted.

Figure 4A:
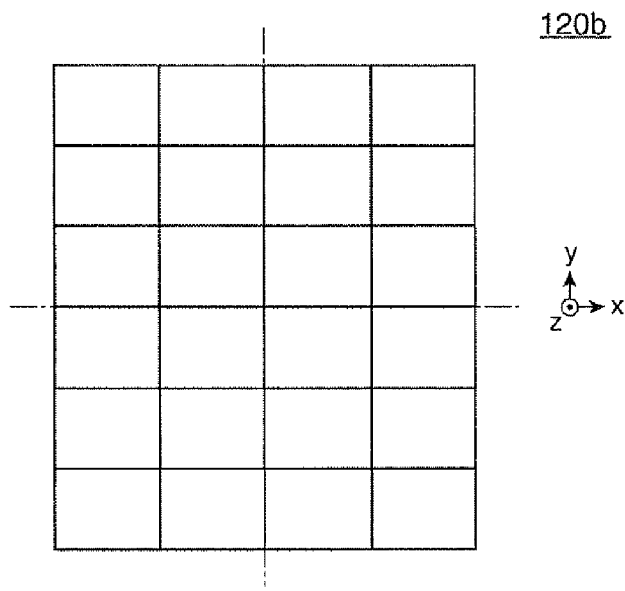
FIGS. 4A and 4B describe another illuminator according to Experimental Example.
Figure 4B:
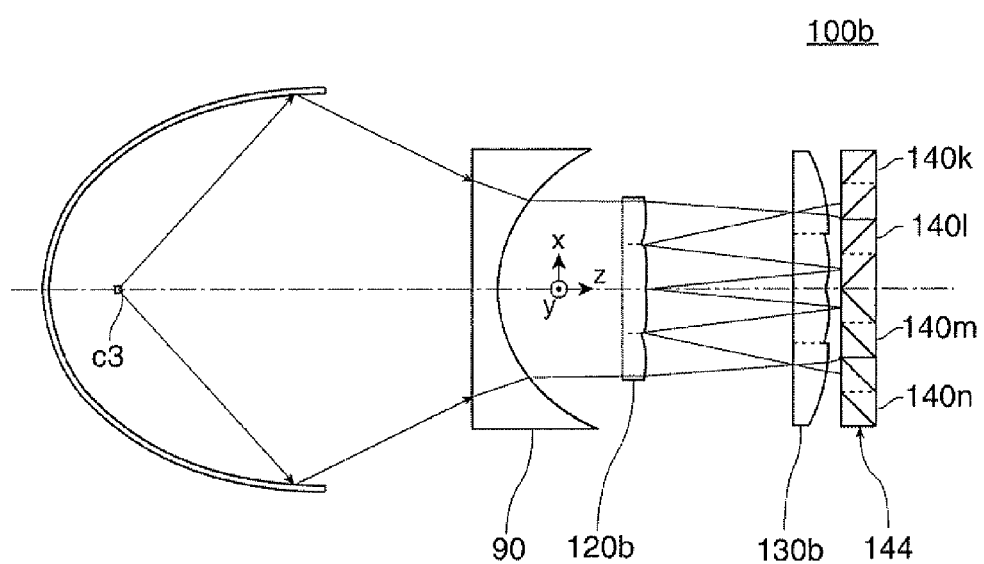

FIGS. 4A and 4B describe another illuminator 100*b* according to Experimental Example. FIG. 4A shows a first lens array 120*b* viewed from the side where a second lens array 130*b* is present, and FIG. 4B shows how light is divided in the illuminator 100*b*. In FIG. 4B, a superimposing lens 150*b* is omitted.

Figure 5:
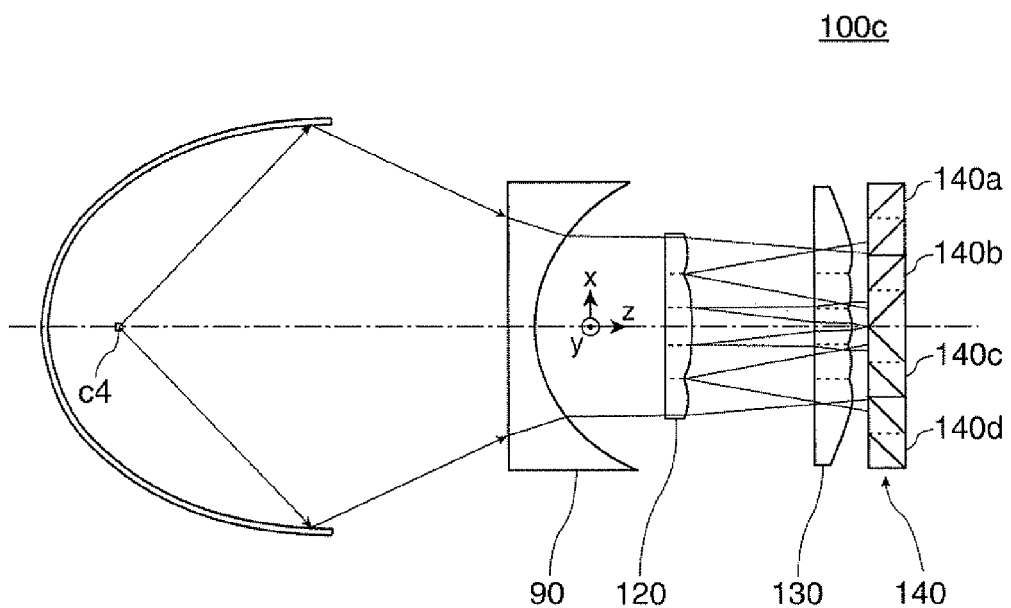
FIG. 5 shows how light is divided in another illuminator according to Experimental Example.

FIG. 5 shows how light is divided in another illuminator 100*c* according to Experimental Example. In FIG. 5, a superimposing lens 150*c* is omitted.

A simulation for evaluating how efficiently an illuminator uses light was made on the illuminators according to Experimental Example, the illuminators 100*a* and 100*b* configured in the same manner as an illuminator of related art and the illuminator 100*c* defined in accordance with the invention.

The illuminators 100*a*, 100*b*, and 100*c* include a common light source and a common concave lens but differ from one another in terms of the configuration of the first lens array, the second lens array, and the polarization conversion element. Reference character c2 in FIG. 3B denotes the center of the light source in the simulation, so do reference character c3 in FIG. 4B and reference character c4 in FIG. 5.

The simulation was first made on the illuminator 100*a*. The first lens array 120*a* in the illuminator 100*a* has a plurality of first lenslets 122*a* (not labeled in FIG. 3A or 3B) arranged in a matrix of eight rows and six columns, as shown in FIG. 3A. Although not described with reference to FIG. 3A or 3B, the second lens array 130*a* also has a plurality of second lenslets 132*a* (not labeled in FIG. 3A or 3B) arranged in a matrix of eight rows and six columns. In a polarization conversion element 142, the number of columns of polarization conversion units is six, as shown in FIG. 3B. Reference characters 140*e* to 140*j* in FIG. 3B denote the polarization conversion units.

With reference to the optical intensity (100.0%) obtained in the simulation made on the illuminator 100*a*, results from the following simulations were evaluated. That is, the intensity of the light emitted from the light source is set to be the same value in all the illuminators, whereby the illuminators can be evaluated in terms of how efficiently they use light by comparing the resultant intensities of the light outputted from the illuminators.

The simulation was next made on the illuminator 100*b*. The first lens array 120*b* in the illuminator 100*b* has a plurality of first lenslets 122*b* (not labeled in FIG. 4A or 4B) arranged in a matrix of six rows and four columns, as shown in FIG. 4A. Although not described with reference to FIG. 4A or 4B, the second lens array 130*b* also has a plurality of second lenslets 132*b* (not labeled in FIG. 4A or 4B) arranged in a matrix of six rows and four columns. In a polarization conversion element 144, the number of columns of polarization conversion units is four, as shown in FIG. 4B. Reference characters 140*k* to 140*n* in FIG. 48 denote the polarization conversion units.

The resultant optical intensity obtained in the simulation made on the illuminator 100*b* was 100.8%, which indicates that the illuminator of related art can hardly use light more efficiently by reducing the number of columns of the polarization conversion units.

The simulation was lastly made on the illuminator 100*c*. A first lens array 120, a second lens array 130, and a polarization conversion element 140 in the illuminator 100*c* are configured in the same manner as the first lens array 120, the second lens array 130, and the polarization conversion element 140 in the illuminator 100 according to the embodiment, and no redundant description will therefore be made.

The resultant optical intensity obtained in the simulation made on the illuminator 100*c* was 106.7%, which indicates that setting the number of columns of the polarization conversion units to be fewer than the number of columns of the first and second lenslets allows the illuminator to use light more efficiently than an illuminator of related art.

The invention has been described with reference to the above embodiment, but the invention is not limited thereto. The invention can alternatively be implemented in a variety of aspects to the extent that they do not depart from the substance of the invention. For example, the following variations can be employed.

1. The dimension, number, material, and shape of each of the components described in the above embodiment are presented by way of example and can be changed to the extent that the change does not compromise the advantageous effects of the invention.

2. In the embodiment described above, the reflector 20 has an ellipsoidal reflection surface, but the reflector 20 is not necessarily configured this way in the invention. For example, the reflector may alternatively have a parabolic reflection surface. In this case, no optical element corresponding to the concave lens 90 in the embodiment is required because the reflector can output collimated light.

3. In the embodiment described above, a transmissive projector is employed, but the invention is not necessarily limited thereto. For example, a reflective projector may be employed. The word "transmissive" used herein means that each light modulator as a light modulating device is of light-transmitting type, such as a transmissive liquid crystal light modulator, and the word "reflective" used herein means that each light modulator as a light modulating device is of light-reflecting type, such as a reflective liquid crystal light modulator. When the invention is applied to a reflective projector, the same advantageous effects as those provided in a transmissive projector can also be provided.

4. The above embodiment has been described with reference to a projector using three liquid crystal light modulators, but the invention is not limited thereto. The invention is also applicable to a projector using one liquid crystal light modulator, a projector using two liquid crystal light modulators, and a projector using four or more liquid crystal light modulators.

5. The invention is applicable not only to a front projection projector that projects a projection image from the observation side but also to a rear projection projector that projects a projection image from the side opposite the observation side.

6. The above embodiment has been described with reference to the case where the illuminator according to the embodiment of the invention is used in a projector, but the invention is not limited thereto. For example, the illuminator according to the embodiment of the invention can be used in other optical apparatus (such as optical disk apparatus, head lamp of automobile, and illumination apparatus).

The entire disclosure of Japanese Patent Application No. 2011-011688, filed Jan. 24, 2011 is expressly incorporated by reference herein.

What is claimed is:

1. An illuminator comprising:
a light source that emits light;
a first lens array including a plurality of first lenslets;
a second lens array including a plurality of second lenslets corresponding to the plurality of first lenslets;
a polarization conversion element that converts light fluxes from the second lens array into polarized light fluxes and outputs the polarized light fluxes; and
a superimposing lens that superimposes sub-light fluxes from the polarization conversion element, wherein
the plurality of first lenslets and the plurality of second lenslets are each arranged in a matrix;
the polarization conversion element is formed of a plurality of columns of polarization conversion units that convert the light fluxes from the plurality of second lenslets into the polarized light fluxes on a column basis, each of the polarization conversion units having a polarization separation layer, a reflection layer, and a wave plate; and
the number of columns of the polarization conversion units is fewer than the number of columns of the first lenslets and the number of columns of the second lenslets.

2. The illuminator according to claim 1, wherein
an interval between the arranged polarization conversion units is greater than a width of each of the first lenslets.

3. The illuminator according to claim 1, wherein
the number of columns of the first lenslets and the second lenslets is greater than the number of columns of the polarization conversion units by one, and
the number of columns of the first lenslets and the second lenslets is an odd number.

4. The illuminator according to claim 3, wherein
the number of columns of the first lenslets and the second lenslets is five, and
the number of columns of the polarization conversion units is four.

5. The illuminator according to claim 4, wherein
light incident on the first lenslets in a column positioned along a center line among the plurality of first lenslets enters the second lens array along an optical axis extending along a plane that contains a central axis of the first lens array and extends along the columns of the first lens array,
light incident on the first lenslets in columns on both sides of the central column enters the second lens array along optical axes that approach the reference plane, and
light incident on the first lenslets in outermost columns among the plurality of first lenslets enters the second lens array along optical axes that extend away from the reference plane.

6. A projector comprising:
the illuminator according to claim 1;
a light modulator that modulates light from the illuminator in accordance with image information; and
a projection system that projects light from the light modulator.

7. A projector comprising:
the illuminator according to claim 2;
a light modulator that modulates light from the illuminator in accordance with image information; and
a projection system that projects light from the light modulator.

8. A projector comprising:
the illuminator according to claim 3;
a light modulator that modulates light from the illuminator in accordance with image information; and
a projection system that projects light from the light modulator.

9. A projector comprising:
the illuminator according to claim 4;
a light modulator that modulates light from the illuminator in accordance with image information; and
a projection system that projects light from the light modulator.

10. A projector comprising:
the illuminator according to claim 5;
a light modulator that modulates light from the illuminator in accordance with image information; and
a projection system that projects light from the light modulator.

11. The projector according to claim 6, wherein the light modulator is a liquid crystal light modulator.

12. The projector according to claim 7, wherein the light modulator is a liquid crystal light modulator.

13. The projector according to claim 8, wherein the light modulator is a liquid crystal light modulator.

14. The projector according to claim 9, wherein the light modulator is a liquid crystal light modulator.

15. The projector according to claim 10, wherein the light modulator is a liquid crystal light modulator.

* * * * *